(No Model.)  2 Sheets—Sheet 1.

G. D. HAWORTH.
CORN PLANTER.

No. 314,239.  Patented Mar. 24, 1885.

Witnesses  Inventor
P. E. Rennemo  George D. Haworth
Irvine Miller  By Coburn & Thacher
  Attorneys.

(No Model.) 2 Sheets—Sheet 2.
G. D. HAWORTH.
CORN PLANTER.
No. 314,239. Patented Mar. 24, 1885.
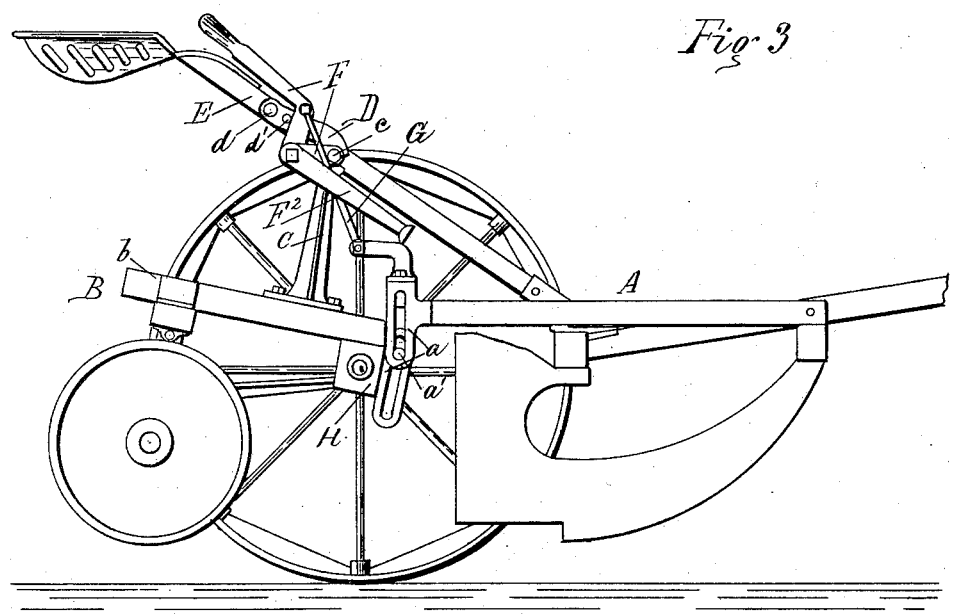
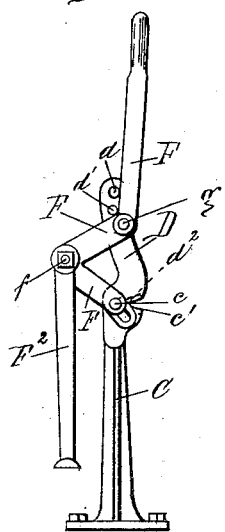
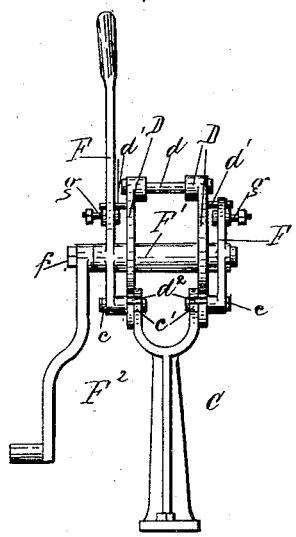
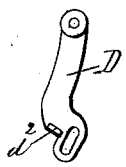
Witnesses
P. E. Rennemo.
Irene Miller
Inventor
George D Haworth
By Coburn & Thacher
Attorneys

UNITED STATES PATENT OFFICE.

GEORGE D. HAWORTH, OF CHICAGO, ILLINOIS.

CORN-PLANTER.

SPECIFICATION forming part of Letters Patent No. 314,239, dated March 24, 1885.

Application filed September 4, 1884. (No model.)

*To all whom it may concern:*

Be it known that I, GEORGE D. HAWORTH, a citizen of the United States, and residing at Chicago, in the county of Cook and State of Illinois, have invented a certain new and useful Improvement in Corn-Planters, which is fully set forth in the following specification, reference being had to the accompanying drawings, in which—

Figure 1:
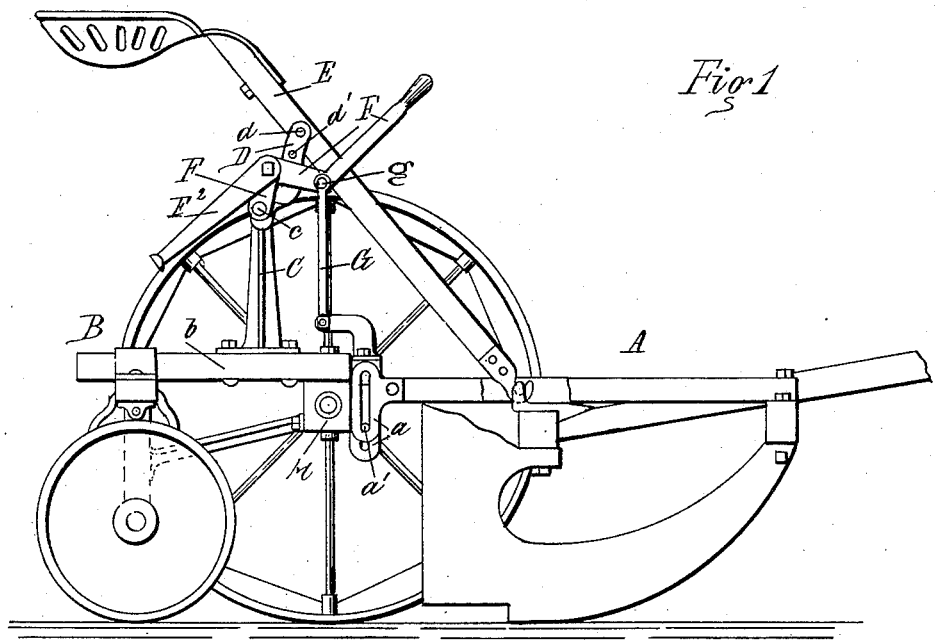
Figure 2:
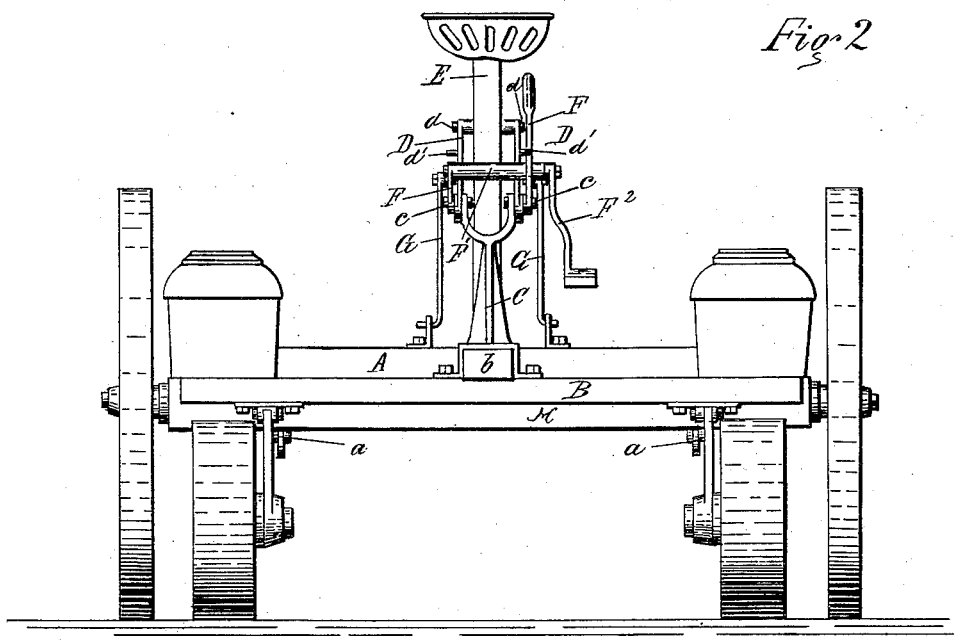

Figure 1 is a side elevation, one wheel being removed, of a corn-planter embodying my invention, the seeding and covering devices being lowered and in operative position; Fig. 2, a rear view of the same; Fig. 3, a similar view with the seeding and covering devices raised and in inoperative position; and Figs. 4, 5, and 6 are detail views.

Like letters refer to like parts in all the figures.

My invention relates to corn-planters, and is more especially applicable to that class known as "check-rowers;" and it consists in certain improvements in the means for raising and lowering the seeding and covering devices, the novel features of which I will now proceed to describe, and then specifically point out in the claims.

In the drawings, A indicates the frame to which the seeding mechanism is attached, and B the main or truck frame to which the covering devices are attached. The two are connected by slotted brackets $a$, through the slots of which a pivot-bolt, $a'$, passes.

On the central bar, $b$, of the truck-frame B is secured a standard, C, the upper end of which is forked, as shown in Fig. 5, and to this forked end are pivoted, by means of bolts or trunnions $c$, links D, the upper ends of which are pivoted by a bolt, $d$, to the seat-bar E, the forward end of which is hooked to the frame A, as shown in Fig. 1, or otherwise pivotally connected thereto.

On the pivot-bolts $c$ are pivoted the levers F, one of which is extended upward within reach of the operator, and to these levers are pivoted, by suitable bolts, $g$, rods G, the other ends of which are pivotally connected to the frame A in any suitable manner. The levers F are attached to or form part of a sleeve, F', through which passes a bolt, $f$, which serves to secure thereto a foot-lever, F². On the links D are pins or projections $d'$, arranged in the path of the levers F.

The operation of the devices is as follows: The parts being in operative position, as shown in Fig. 1, the operator grasps the lever F and draws it toward him, the two levers F turning on the pivot-bolts $c$. By this motion the frame A and the seeding devices are raised from the ground by means of the connecting-rod G, and at the same time the forward end of the seat-bar E is raised in a vertical line, thereby forcing the links D backward and upward. When the parts have reached the relative positions shown in Fig. 4, the levers F strike the pins $d'$ on the links D, and can no longer turn on the pins C as a fulcrum. They now turn on the pins $d$ as a fulcrum, thereby forcing forward the lower ends of the links D and the upper end of the standard C, the links turning on the bolt $d$, and the standard and the frame B, to which it is attached, turning with the main axle H. As soon as the pivot-bolts $c$ are forward of the line connecting the bolt $d$ and axle H, it is evident that the weight of the driver will be sufficient in itself to force these bolts forward by a toggle action, thereby raising the covering-wheels. The seat-bar E rests between the forked ends of the standard C and prevents any further upward movement of the standard or downward movement of the seat-bar. The parts are now locked in the position shown in Fig. 3, and will remain so as long as desired, for it is evident that the covering-wheels cannot descend without a backward movement of the upper end of the standard C, and this cannot occur without an upward movement of the seat-bar E, such movement being prevented by the weight of the driver, and also by the weight of the front frame, A, the connecting-rod G passing in the rear of the pivot-bolts $c$. The parts are lowered in an obvious manner by a reverse movement of the levers F.

It will be seen from the above description that the seeding devices and covering devices are raised in their proper order by a single continuous movement of a single lever with great simplicity and ease of operation. The foot-lever F² is added as a mere convenience of operation and may be dispensed with.

In order to limit the downward motion of the covering devices, I form on the inner faces of the links D lugs or projections $d^2$, which engage with the projecting ends $c'$ of the standard C, and prevent any further forward movement of the upper end of the links D, and consequently any further downward movement of the frame B. The lower ends of the links D are slotted, as shown in Fig. 4, to receive the pivot-bolts $c$ and allow the necessary play of the parts, so that when the projections $d^2$ rest upon the projecting ends $c'$ of the standard C the links will turn or roll upon the said projections as a pivot, their slotted lower ends permitting this movement, so as to retain the center of gravity in a proper position between the main covering-wheels and the rear covering-wheels.

I have shown and described the levers, links, connecting-rods, &c., as being in duplicate, but it is evident that one of each may be omitted; but I deem the construction shown and described preferable, as being stronger, better balanced, and certain in operation. Moreover, although I have shown and described the pins or projections $d'$ as arranged on the links D, so as to be engaged by the levers F, it is obvious that by a mere reversal these pins or projections may be formed upon the levers F and engage with the sides of the links D. The position of these pins may also be varied from that shown in the drawings.

It is obvious that many changes and modifications may be made in the mechanical arrangement of the parts without departing from the principle of my invention, and I therefore do not wish to be understood as limiting myself to the precise details of construction shown and described.

Having thus described my invention, what I claim as new, and desire to secure by Letters Patent, is—

1. In a corn-planter, the combination, with the rear frame carrying the covering devices and mounted on wheels, of a link or links pivotally connected therewith, and with a seat-bar pivoted at its forward end to the frame carrying the seeding mechanism, and a lever pivotally connected at or near the pivotal connection of the rear frame and said link or links, and arranged to engage with said link or links, substantially as and for the purposes specified.

2. In a corn-planter, the combination, with the rear frame mounted on wheels and having a forked standard secured to it, of links pivoted to said standard and to opposite sides of a seat-bar, the forward end of which is pivotally connected to the front frame, and levers mounted on the pivot-bolts which connect the links and standard arranged to engage the links, and having connecting-rods pivoted to the front frame, the said rods being arranged in the rear of the said pivot-bolts when the frames are raised, substantially as and for the purposes specified.

3. In a corn-planter, the combination, with the frames, seat-bar, standard, levers, and connecting-rods, arranged as described, of the links constructed to engage with the levers, and having inward projections to engage with projections on the standard, substantially as and for the purposes set forth.

4. In a corn-planter, the combination, with the frames, seat-bar, standard, levers, and connecting-rods, arranged as described, of the links constructed to engage with the levers, and having inward projections to engage with projections on the standard, the said links being slotted at their lower end to receive the pivot-bolts on the standard, substantially as and for the purposes specified.

GEORGE D. HAWORTH.

Witnesses:
IRVINE MILLER,
A. M. BEST.